(12) United States Patent
Zhou et al.

(10) Patent No.: US 11,101,675 B2
(45) Date of Patent: Aug. 24, 2021

(54) AUDIO DEVICE POWER SUPPLY SYSTEM

(71) Applicant: QINGDAO GOERTEK TECHNOLOGY CO., LTD., Qingdao (CN)

(72) Inventors: Honggang Zhou, Qingdao (CN); Jinguo Zhang, Qingdao (CN)

(73) Assignee: QINGDAO GOERTEK TECHNOLOGY CO., LTD., Qingdao (CN)

(*) Notice: Subject to any disclaimer, the term of this patent is extended or adjusted under 35 U.S.C. 154(b) by 475 days.

(21) Appl. No.: 16/306,177

(22) PCT Filed: Dec. 20, 2016

(86) PCT No.: PCT/CN2016/111114
§ 371 (c)(1),
(2) Date: Nov. 30, 2018

(87) PCT Pub. No.: WO2017/206490
PCT Pub. Date: Dec. 7, 2017

(65) Prior Publication Data
US 2021/0226464 A1   Jul. 22, 2021

(30) Foreign Application Priority Data
May 30, 2016 (CN) .......................... 201610366744.4

(51) Int. Cl.
*H04R 1/10* (2006.01)
*H02J 7/00* (2006.01)
*H02M 3/04* (2006.01)

(52) U.S. Cl.
CPC ............ *H02J 7/0063* (2013.01); *H02M 3/04* (2013.01); *H04R 1/1025* (2013.01);
(Continued)

(58) Field of Classification Search
CPC ...... H02J 7/0063; H02M 3/04; H04R 1/1025; H04R 1/1041
See application file for complete search history.

(56) References Cited

U.S. PATENT DOCUMENTS 10,170,738 B2 *   1/2019  Huang ................. H04M 1/0262
2014/0070774 A1 *  3/2014  Terlizzi ................. H02J 7/0047
                                                      320/162
(Continued)

FOREIGN PATENT DOCUMENTS

| CN | 204615426 | 9/2015 |
| CN | 105429247 | 3/2016 |
| CN | 105610235 | 5/2016 |

*Primary Examiner* — Simon King
(74) *Attorney, Agent, or Firm* — Jiwen Chen; Jacobson Holman PLLC

(57) ABSTRACT

A power system for audio device comprises a mobile terminal and an audio device, wherein the mobile terminal including a first control unit, a battery, a first energy management unit configured to power the mobile terminal, a first power switch and a first port; the audio device including a second control unit, a second energy management unit configured to power the audio device, a second power switch, a second port matching with the first port and a third port; energy provided by an external power supply transmitting to the second power switch, the second port, the first port and the first energy management unit via the third port; the third port being connected to the second energy management unit and configured to transmit energy to the second energy management unit. The present invention ensures that if low battery level is being detected, the external power supply connected could supply energy, so as to avoid the interruption due to low power level and ensure the operation of the audio device, thereby improving the user experience and the product competitiveness and facilitating the promotion.

10 Claims, 2 Drawing Sheets

(52) U.S. Cl.
CPC ....... *H04R 1/1041* (2013.01); *H04R 2420/09* (2013.01); *H04R 2499/15* (2013.01)

(56) References Cited

U.S. PATENT DOCUMENTS

| | | | |
|---|---|---|---|
| 2015/0379992 A1* | 12/2015 | Lee | G06F 1/3287 |
| | | | 704/275 |
| 2016/0041808 A1* | 2/2016 | Pelland | H04R 3/00 |
| | | | 381/123 |
| 2017/0012446 A1* | 1/2017 | Lim | H02J 3/007 |
| 2017/0222450 A1* | 8/2017 | Lee | H02J 7/00 |
| 2018/0217809 A1* | 8/2018 | Yu | G06F 3/167 |

\* cited by examiner

AUDIO DEVICE POWER SUPPLY SYSTEM

CROSS-REFERENCE TO RELATED APPLICATIONS

The present application is based on and claims priority to Chinese patent application No. 201610366744.4 filed on May 30, 2016, the content of which are also hereby incorporated by reference in its entirety.

FIELD OF THE INVENTION

The invention belongs to the field of electronic technology, and in particular to a power system for audio device.

BACKGROUND

Smartphone-based head mounted display derives the energy required for operation from the battery built-in the matched mobile phone.

However, such system is severely restricted due to constraint on battery capacity, especially as experiencing virtual reality with energy consumption increasing rapidly. To assure reliable service, the user has to maintain the battery at a certain level to survive a signal operation, or else awkward situation may arise in, such as 3D movie being watched or VR game being played shutting down on battery level without warning. The user has to remove the mobile phone from the head-mounted display and charge it separately, that would obviously reduce user satisfaction.

SUMMARY

Some embodiments of the present application provide a power system for audio device. The power system comprises: a mobile terminal comprising a first control unit, a battery, a first energy management unit configured to power the mobile terminal, a first power switch and a first port; an audio device comprising a second control unit, a second energy management unit configured to power the audio device, a second power switch, a second port matching with the first port and a third port; wherein the first control unit configured to turn on or turn off the first power switch and the second control unit configured to turn on or turn off the second power switch; as the first power switch turning on and the second power switch turning off, energy from the battery consecutively transmitting to the first energy management unit, the first power switch, the first port, the second port and the second energy management unit; as the first power switch turning off and the second power switch turning on, energy from an external power supply transmitting to the third port, and then consecutively transmitting to the second power switch, the second port, the first port and the first energy management unit via the third port; the third port being connected to the second energy management unit and configured to transmit energy to the second energy management unit.

Other features and advantages of the present invention will become more apparent from the detailed description of the embodiments.

DETAILED DESCRIPTION

For the purposes of promoting and understanding of the principles of the invention, detailed description will now be made with reference to the drawings.

Figure 1:
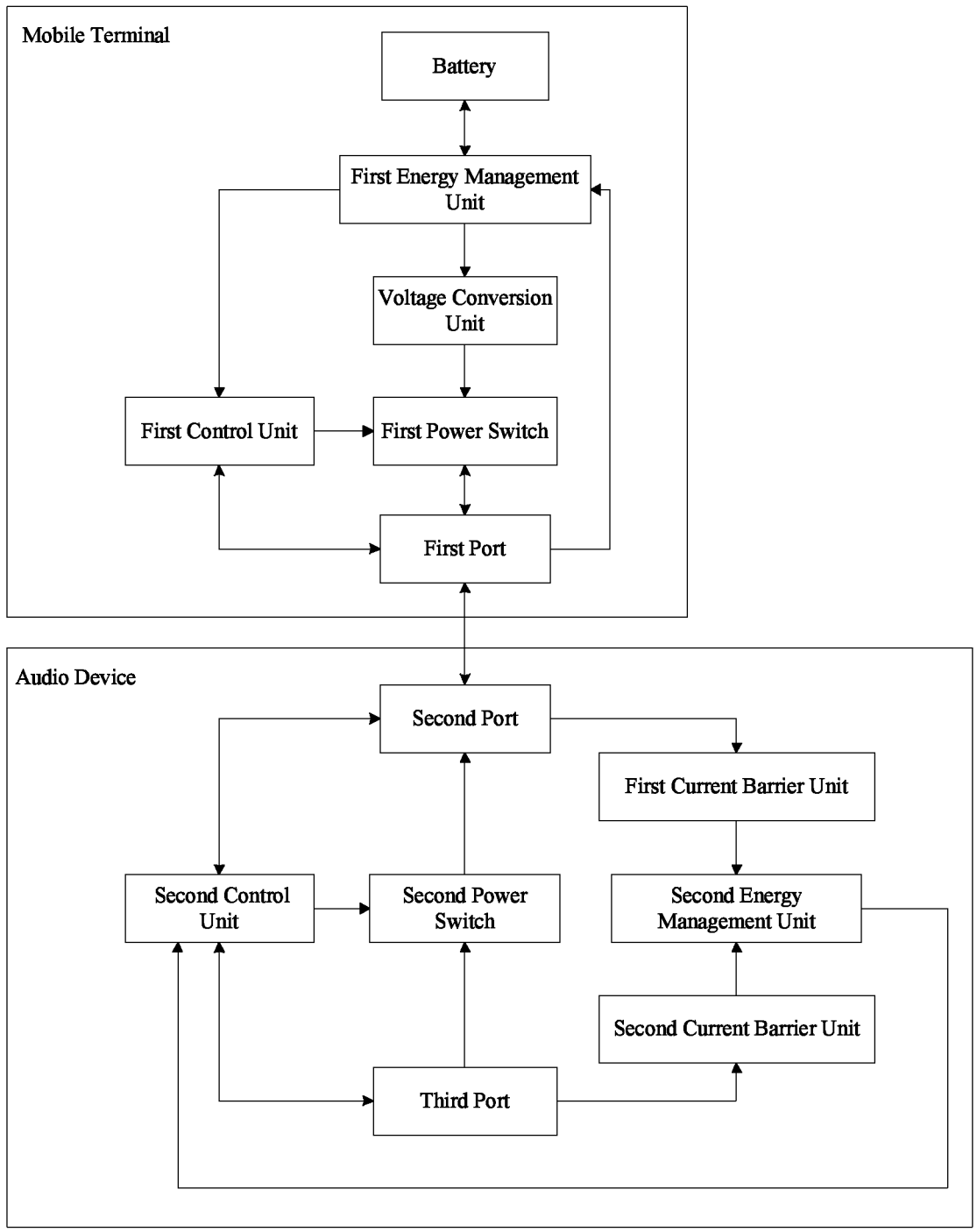
FIG. 1 is a circuit block diagram of an embodiment of a power system for audio device according to the present invention.

As shown in FIG. 1, one embodiment of a power system for audio device advantageously provides a good energy management to solve the problem of powering down of audio device from low battery.

The power system for audio device mainly comprises an audio device and a mobile terminal, wherein the audio device is based on the mobile terminal, namely the audio device is used matching with the mobile terminal. As shown in FIG. 1, the mobile terminal mainly includes a first control unit, a battery, a first energy management unit, a first power switch and a first port, and wherein the battery is connected to the first energy management unit, the first energy management unit is connected to the first port via the first power switch, the first control unit is configured to turn on or turn off the first power switch, and the first energy management unit is configured to power the mobile terminal. The audio device mainly includes a second control unit, a second energy management unit, a second power switch, a third port, and a second port matching with the first port, wherein the third port is connected to the second port via the second power switch, the second control unit is configured to turn on or turn off the second power switch, the third port is connected to the second energy management unit, the second port is connected to the second energy management unit, and the second energy management unit is configured to power the audio device. The first port is connected to the second port to transmit signal and energy.

When the third port is not connected to an external power supply, the second control unit turns off the second power switch, and in the meanwhile the first control unit turns on the first power switch. The energy derived from the external power supply transmits consecutively to the first energy management unit, the first power switch, the first port, the second port and the second energy management unit, such that the mobile terminal and the audio device are both powered from the battery via the first energy management unit and the second energy management unit respectively, and neither of them is powered from the external power supply.

When the third port is connected to an external power supply, the second control unit turns on the second power switch, and in the meanwhile the first control unit turns off the first power switch. Energy derived from the external power supply firstly transmits to the third port, and then further transmits to the second power switch, the second port, the first port, the first energy management unit and the battery via the third port, such that the mobile terminal is being powered by the external power supply via the first energy management unit and the battery is being charged by the external power supply as well; the third port is connected to the second energy management unit, and energy from the external power supply is being transmitted to the second energy management unit via the third port, the audio device is powered from the external power supply via the second energy management unit. That is to say, the overall system is powered from the external power supply.

As such, in the illustrated embodiment according to FIG. 1, in the event that the audio device is used matching with the mobile terminal, the described power system allows the first port to be connected to the second port, with that the overall system could be powered from the battery built-in the mobile terminal or from an external power supply. If the battery level could not survive as the audio device being used matching with the mobile terminal, the system could alternatively switch to be powered from the external power supply. Therefore the shutting down due to low battery could be avoided, which ensures the smooth operation of the audio device, thereby improving the user satisfaction, and further improving the competitiveness of the product its promotion.

In order to generate an appropriate voltage for the audio device, the mobile terminal additionally comprises a voltage conversion unit, and the first energy management unit is connected to the first power switch via the voltage conversion unit.

In this embodiment, the voltage conversion unit is preferably a DC-DC converter for converting the voltage output by the first energy management unit into a required voltage of the audio device. For example, the DC-DC converter converts the voltage output by the first energy management unit to 5V, and then supplies to the audio device via the first power switch and the first port.

The audio device additionally comprises a current barrier unit, and the current output from the second port flows into the second energy management unit via the current barrier unit in one direction so as to avoid the reverse flow.

The first current barrier unit is preferably a Schottky diode, the anode of the Schottky diode is connected to the second port, and the cathode of the Schottky diode is connected to the second energy management unit to ensure current flows from the second port to the second energy management unit.

A second current barrier unit is further disposed in the audio device, and the current output by the third port is transmitted to the second energy management unit through the second current barrier unit in one direction so as to avoid the reverse flow.

The second current barrier unit is preferably a Schottky diode, the anode of the Schottky diode is connected to the third port, and the cathode of the Schottky diode is connected to the second energy management unit to ensure current flows from the third port to the second energy management unit.

In order to detect whether the third port is well connected to an external power supply, a detection circuit is further disposed in the audio device, and the third port is connected to the second control unit through the detection circuit.

Figure 2:
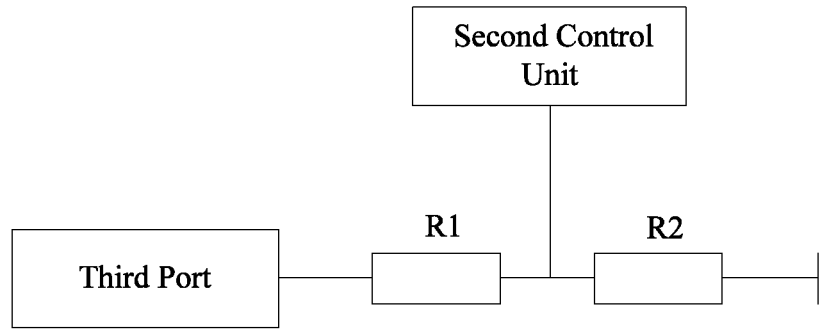
FIG. 2 is a circuit block diagram of a detection circuit of a power system for audio device according to the present invention.

The detection circuit mainly includes a first resistor R1 and a second resistor R2. As shown in FIG. 2, one end of the first resistor R1 is connected to the third port, and the other end of the first resistor R1 is connected to one end of the second resistor R2, and the other end of the second resistor R2 is grounded, and the connection node of the first resistor R1 and the second resistor R2 is connected to the second control unit.

When the third port is not being connected to an external power supply, the voltage at the connection node of the first resistor R1 and the second resistor R2 is 0, and the second control unit detects a low level signal; when the third port is being connected to an external power supply, the first resistor the voltage at the connection node of the first resistor R1 and the second resistor R2 is not 0, and the second control unit detects a high level signal. The second control unit determines whether an external power source is being well connected to according to the low level signal or the high level signal detected.

Both of the first port and the second port are USB port or lighting port. The USB port and the lighting port are versatile so as to facilitate the connection of the mobile terminal and the audio device. Due to the first port being matched with the second port, if the first port is a USB plug or socket, the second port is also a USB plug or socket; or if the second port is a lighting plug or socket, the second port is also a lighting plug or socket.

The third port is preferably a USB port or a lighting port, which is versatile so as to facilitate the connection of the third port and an external power supply.

Figure 3:
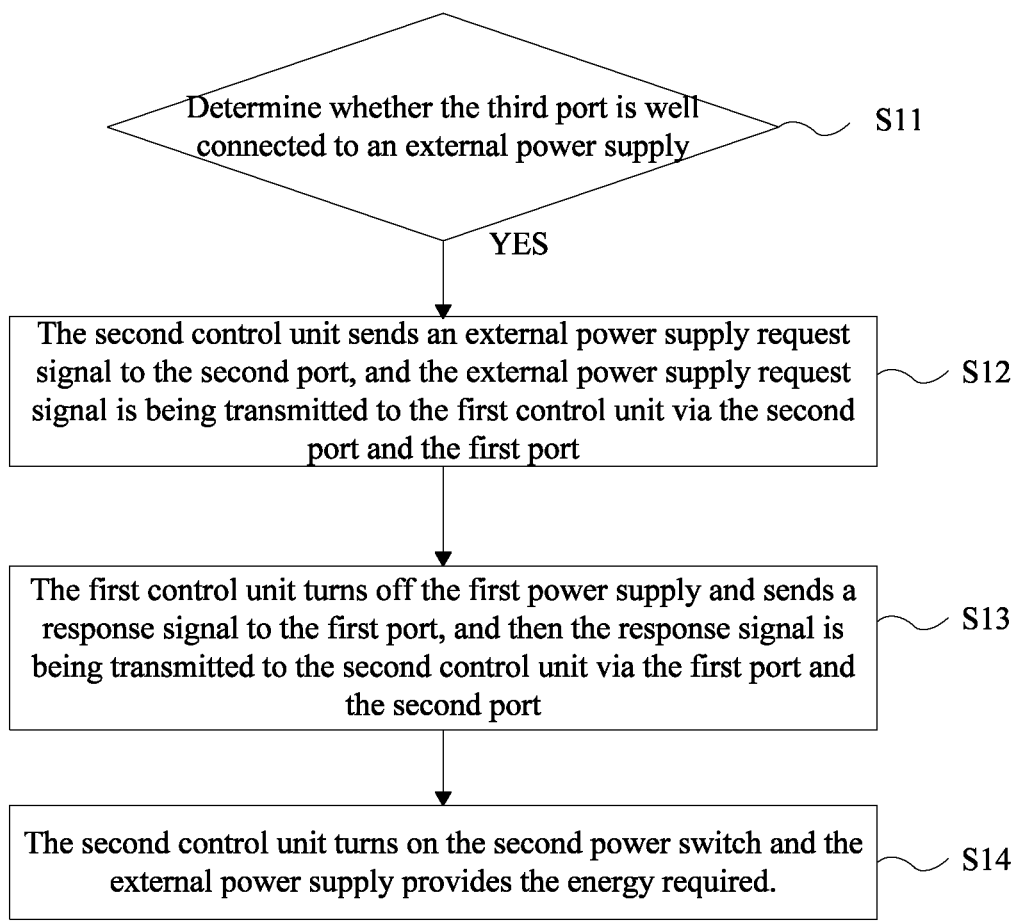
FIG. 3 is a partial operational flowchart of a power system for audio device according to the present invention.

As shown in FIG. 3, the operation process beginning with being powered from battery comprises:

Step S11: The second control unit detects whether the third port is well connected to an external power supply.

If the third port is connected to an external power source, Step S12 is being executed.

Step S12: The second control unit sends an external power supply request signal to the second port, and the external power supply request signal is being transmitted to the first control unit via the second port and the first port.

Step S13: The first control unit turns off the first power supply and sends a response signal to the first port, and then the response signal is being transmitted to the second control unit via the first port and the second port.

Step S14: The second control unit turns on the second power switch and the external power supply provides the energy required.

The energy provided by the external power source is transmitted to the second energy management unit via the third port and the second current barrier unit, and also transmitted to the first energy management unit via the third port, the second power switch, the second port and the first port. The overall system is powered by the external power supply.

As being powered from the external power supply, the first control unit detects the real-time voltage at the first port. If the voltage at the point drops sharply, to be specific changes from a high level signal to a low level signal, such as falling from 5V to 0.5V, it indicates that the external power supply is being removed. The first control unit turns on the first power switch and sends out a control signal to the second control unit. The second control unit turns off the second power switch as receiving the control signal. That means it switches into the mode powered from the battery. In this way, the fact whether the external power supply is being connected to is not only determined by the second control unit and the detection circuit, but also relies on the detected voltage at the first port by the first control unit, thereby improving the detection accuracy and the stability of the power supply.

In the event of being powered from the battery, the current battery level is being detected by the first control unit. If the battery level is lower than 10% of the value of being fully charged, a low battery signal is being displayed.

The mobile terminal is a mobile phone, a PAD and the like, and the audio device is a head mounted display, a speaker, and the like. The audio device is used matching with the mobile terminal.

For example, the mobile terminal is a mobile phone and the audio device is a head-mounted display based on the display of the mobile phone; a first port of the mobile phone is plugged into a second port of the head-mounted display and VR experience is being provided to the user, in which the overall system is being powered from the battery; if low battery level is being detected, an external power supply is being inserted into a third port of the head-mounted display, then both of the mobile phone and the head mounted display are powered from the external power supply and the battery is being charged. The VR experience could continue without having to remove the mobile phone from the head mounted display for charging, thereby improving user experience, and further enhancing product competitiveness and facilitating promotion.

For example, the mobile terminal is a mobile phone and the audio device is a speaker, which are powered from the battery; if low battery level is being detected, an external power supply is being inserted into a third port of the speaker, then both of the mobile phone and the speaker are being powered from the external power supply. The audio effect could continue without having to remove the mobile phone from the speaker, thereby improving user experience, and further enhancing product competitiveness and facilitating promotion.

The power system for audio device allows the system to be powered from a battery within the mobile terminal or from an external power supply as required. Accordingly, if low battery level is being detected, the external power supply could be switched to automatically, so as to avoid the interruption due to low power level and ensure the operation of the audio device, thereby improving the user experience and the product competitiveness and facilitating the promotion.

It will nevertheless be understood that no limitation of the scope of the invention is thereby intended. Any alternations and further modifications in the described embodiments, and any further applications of the principles of the invention as described herein are contemplated as would normally occur to one skilled in the art to which the invention relates.

What we claim is:

1. A power system for audio device comprises:
    a mobile terminal including a first control unit, a battery, a first energy management unit configured to power the mobile terminal, a first power switch and a first port;
    an audio device including a second control unit, a second energy management unit configured to power the audio device, a second power switch, a second port matching with the first port and a third port;
    wherein the first control unit configured to turn on or turn off the first power switch and the second control unit configured to turn on or turn off the second power switch;
    as the first power switch turning on and the second power switch turning off, energy from the battery consecutively transmitting to the first energy management unit, the first power switch, the first port, the second port and the second energy management unit;
    as the first power switch turning off and the second power switch turning on, energy from an external power supply transmitting to the third port, and then consecutively transmitting to the second power switch, the second port, the first port and the first energy management unit via the third port; the third port being connected to the second energy management unit and configured to transmit energy to the second energy management unit.

2. The power system for audio device according to claim 1, wherein the mobile terminal comprises a voltage conversion unit, the first energy management unit being connected to the first power switch via the voltage conversion unit.

3. The power system for audio device according to claim 2, wherein the voltage conversion unit is a DC-DC convertor.

4. The power system for audio device according to claim 1, wherein the audio device comprises a first current barrier unit, the current at the second port being transmitted to the second energy management unit via the first current barrier unit.

5. The power system for audio device according to claim 4, wherein the first current barrier unit is a Schottky diode with the anode being connected to the second port and the cathode being connected to the second energy management unit.

6. The power system for audio device according to claim 1, wherein the audio device comprises a second current barrier unit, the current at the third port being transmitted to the second energy management unit via the second current barrier unit.

7. The power system for audio device according to claim 6, wherein the second current barrier unit is a Schottky diode with the anode being connected to the third port and the cathode being connected to the second energy management unit.

8. The power system for audio device according to claim 1, wherein the first port and the second port are USB port or lighting port, the third port is USB port or lighting port.

9. The power system for audio device according to claim 1, wherein the audio device comprises a detection circuit including a first resistor and a second resistor, one end of the first resistor being connected to the third port, and the other end of the first resistor being connected to one end of the second resistor, the other end of the second resistor being grounded, and the connection node of the first resistor and the second resistor being connected to the second control unit.

10. The power system for audio device according to claim 1, the mobile terminal is a mobile phone or a PAD, and the audio device is a head mounted display or a speaker.

* * * * *